(12) United States Patent
Chen et al.

(10) Patent No.: US 7,336,513 B1
(45) Date of Patent: Feb. 26, 2008

(54) METHOD OF COMPENSATING OUTPUT VOLTAGE DISTORTION OF HALF-BRIDGE INVERTER AND DEVICE BASED ON THE METHOD

(75) Inventors: Yaow-Ming Chen, Chia-Yi (TW); Wei-Cheng Wang, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 0 days.

(21) Appl. No.: 11/519,022

(22) Filed: Sep. 12, 2006

(51) Int. Cl.
*H02M 3/335* (2006.01)
*H02M 7/44* (2006.01)
*H02M 7/68* (2006.01)

(52) U.S. Cl. .................. 363/98; 363/132; 363/17

(58) Field of Classification Search .......... 363/17, 363/39, 40, 56.02, 98, 132
See application file for complete search history.

(56) References Cited

U.S. PATENT DOCUMENTS 6,314,007 B2   11/2001   Johnson, Jr. et al.
6,483,730 B2 * 11/2002   Johnson, Jr. .............. 363/123
6,853,097 B2 *  2/2005   Matsuda et al. ............ 307/66
7,050,312 B2 *  5/2006   Tracy et al. ............... 363/37

* cited by examiner

*Primary Examiner*—Bao Q. Vu
(74) *Attorney, Agent, or Firm*—Bacon & Thomas, PLLC (57) ABSTRACT

A method of compensating output voltage distortion of a half-bridge inverter and a device based on the method discloses that the method includes the steps of measuring the voltage of the capacitor of the half-bridge inverter and then detecting the output voltage of the same; comparing the capacitor voltage and the output voltage to identify how much degree the distortion is resulted from the capacitor voltage unbalance, wherein if the degree of the distortion matches a predetermined condition, proceed to the next step; and charging the capacitor through a compensating circuit to compensate the capacitor for the insufficient electric energy to enable the capacitor to provide the load with the sufficient electric energy. Thus, the drawback that the waveform of the output voltage can be improved to enable the device and the method to have advantages of simple circuit, easy control, reduced capacitance, and being applicable to any output frequency.

7 Claims, 7 Drawing Sheets

METHOD OF COMPENSATING OUTPUT VOLTAGE DISTORTION OF HALF-BRIDGE INVERTER AND DEVICE BASED ON THE METHOD

BACKGROUND OF THE INVENTION

1. Field of the Invention

The present invention relates generally to electronic circuits, and more particularly, to a method of compensating output voltage distortion of a half-bridge inverter and a device based on the method.

2. Description of the Related Art

Figure 9:
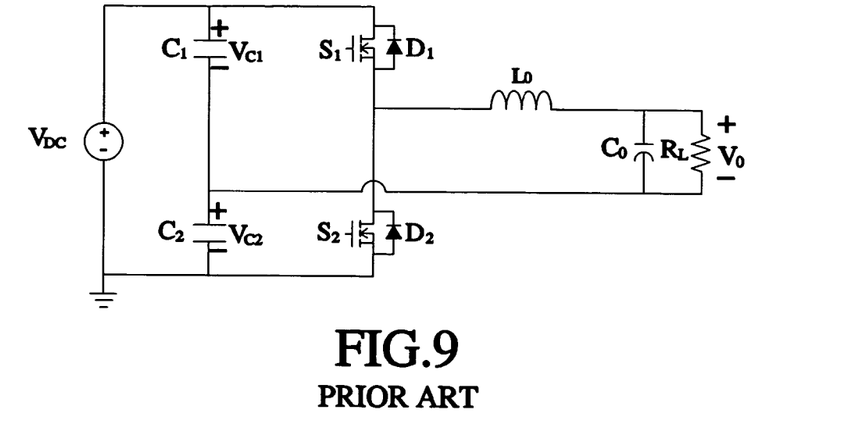
FIG. 9 is a schematic view of a circuitry of a conventional half-bridge inverter, illustrating its structure.

Referring to FIG. 9, a circuitry of a conventional half-bridge inverter includes a direct current (DC) voltage source $V_{DC}$, an upper capacitor $C_1$ and a lower capacitor $C_2$, both of which are serially interconnected, two active switches $S_1$ and $S_2$, and an output end. The output end has a filter circuit composed of an inductor $L_O$ and a capacitor $C_O$. A general half-bridge inverter is controlled by sinusoidal pulse width modulation and the two switches $S_1$ and $S_2$ are complementarily switchable.

During the positive half cycle of the output voltage of the above-mentioned half-bridge inverter, there are two operational statuses as follows.

Figure 10:
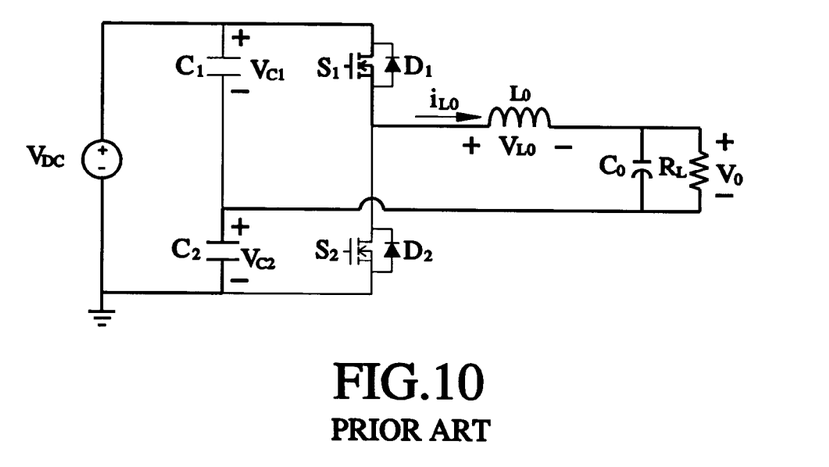
FIG. 10 is another schematic view of the circuitry of the conventional half-bridge inverter, showing a current path.

1. The Switch $S_1$ Being Closed-Circuit and the Switch $S_2$ Being Open-Circuit As shown in FIG. 10, while the energy of the DC voltage source $V_{DC}$ is transmitted to the output end through the switch $S_1$, an inductor current $i_{LO}$ rises linearly and the cross voltage at two ends of the inductor $L_O$ is the difference between the cross voltage of the upper capacitor and the output voltage during the positive half cycle. According to the inductor voltage-current relationship, the larger the cross voltage at the two ends of the inductor is, the larger the rising slope of the output inductor current of the inverter becomes.

Figure 11:
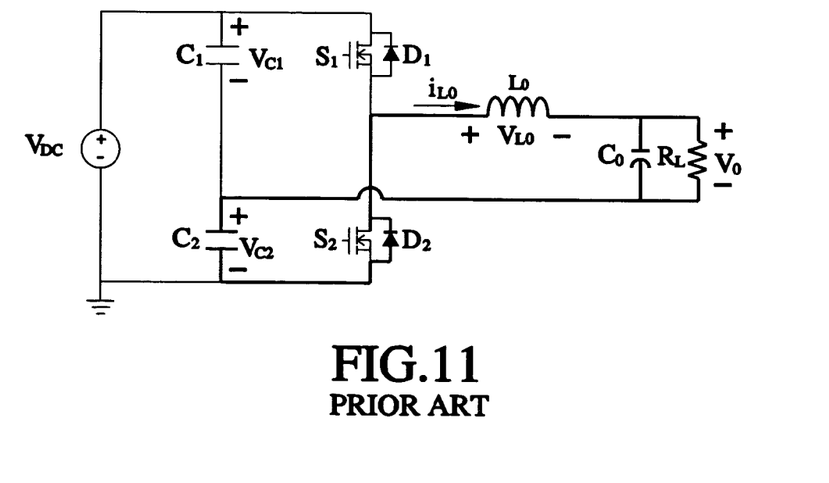
FIG. 11 is another schematic view of the circuitry of the conventional half-bridge inverter, showing another current path.

2. Both of the Two Switches Being Open-Circuit

As shown in FIG. 11, because of continuity, the inductor current passes through a parasitic diode of the switch $S_2$ to generate a discharge path and the current lowers gradually. If the switch $S_2$ is turned on, the current path will not change. While the switch $S_2$ is open-circuit and the switch $S_1$ is closed-circuit again, the half-bridge inverter returns to the first operational status.

During the negative half cycle of the output voltage of the above-mentioned half-bridge inverter, there are also two operational statuses as follows.

Figure 12:
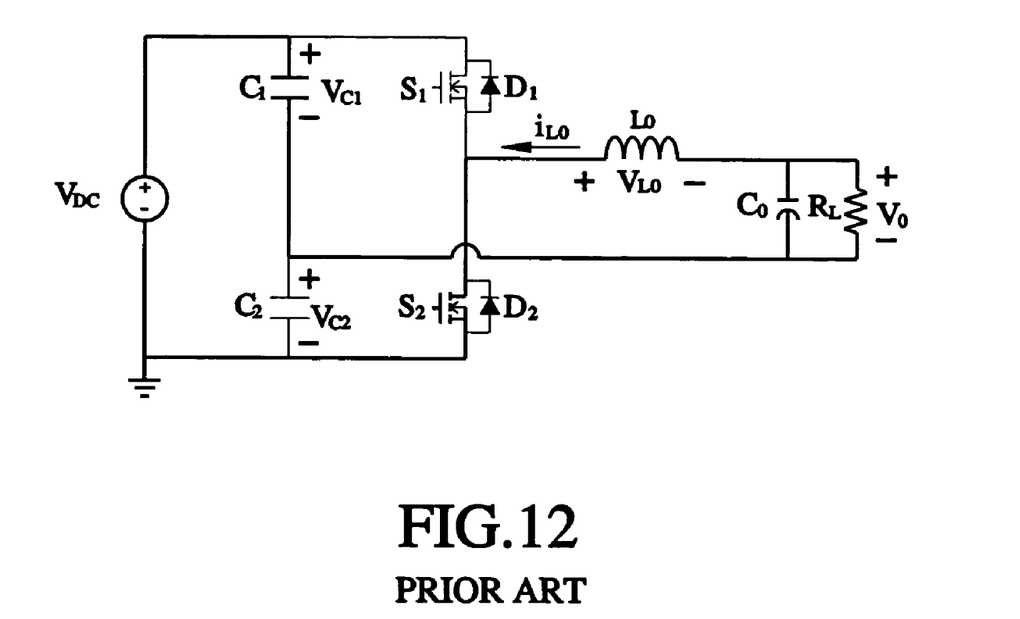
FIG. 12 is another schematic view of the circuitry of the conventional half-bridge inverter, showing another current path.

1. The Switch $S_1$ Being Open-Circuit and the Switch $S_2$ Being Closed-Circuit As shown in FIG. 12, except the different direction that the inductor current $i_{LO}$ flows, it is the same as the status indicated in the first operational status during the positive half cycle of the output voltage of the half-bridge inverter.

Figure 13:
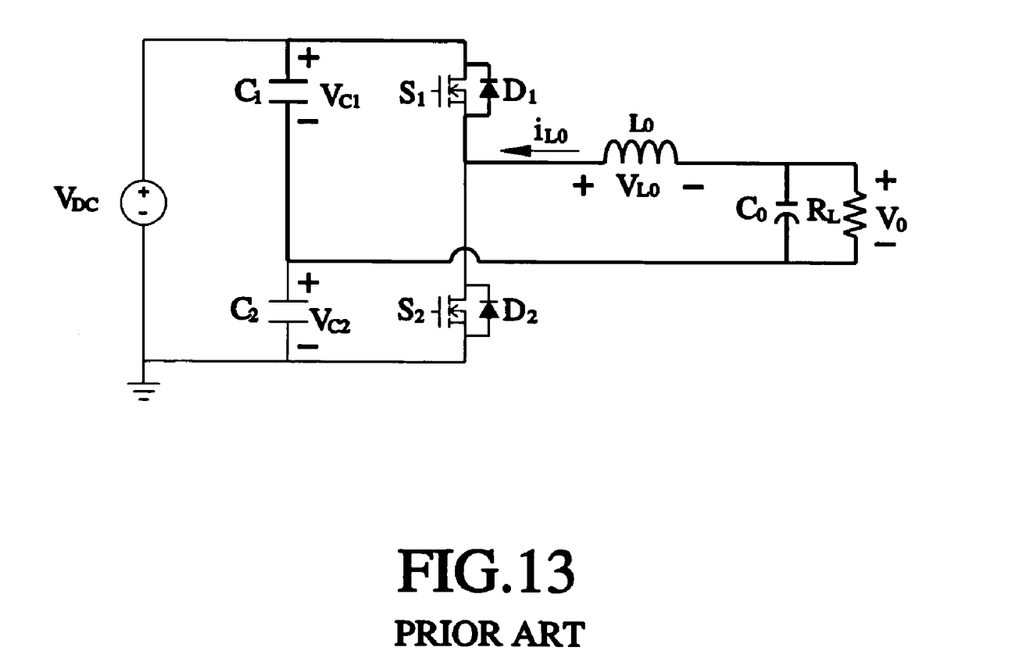
FIG. 13 is another schematic view of the circuitry of the conventional half-bridge inverter, showing another current path.

2. Both of the Two Switches Being Open-Circuit

As shown in FIG. 13, except the path that the inductor releases energy is changed to the discharge path that the inductor current passes through a parasitic diode of the switch $S_2$, it is the same as the status indicated in the second operational status during the positive half cycle of the output voltage of the half-bridge inverter.

Because the waveform of the output voltage of the half-bridge inverter is derived from the duty ratio of a regulating switch, while the output voltage is positive, the duty ratio of the upper switch $S_1$ becomes large; meanwhile, the discharge time of the upper capacitor $C_1$ becomes long and the charge time of the same becomes short. Such repeated operations keep the capacitor voltage downgrading.

Further, the input DC voltage is the sum of the voltages of the two capacitors, such that the voltage of the lower capacitor $C_2$ rises to cause capacitor voltage unbalance between the upper and lower capacitors.

When the capacitor voltage unbalance reaches a considerable extent, one of the capacitors generates distortion resulted from undervoltage to further cause distorted output voltage. If the waveform of the output voltage is a sinusoidal waveform originally, however while affected by the output voltage distortion, the waveform of the output voltage will become a distorted sinusoidal one.

Conventionally, there are some methods of balancing the voltage of the capacitors of the half-bridge inverter for solution to the distorted waveform of the output voltage resulted from the capacitor voltage unbalance. The methods include:

1. Enlarging Capacitance

Enlarging the capacitance can relieve and even prevent the capacitor voltage unbalance and thus the waveform of the output voltage avoids distortion. However, it will increase the size and the cost of the capacitor.

2. Increasing Output Frequency

Increasing output frequency can shorten the time of the positive/negative half cycle to further shorten the time that one of the upper and lower capacitors provides electric energy such that the capacitor voltage falling degree can be reduced to further relieve and even avoid the capacitor voltage unbalance, thus preventing the waveform of the output voltage from distortion. However, it is not applicable to the low output frequency. Further, the change of the output frequency specification is impractical.

3. Adopting Passive Capacitor Voltage Balancing Circuit

Respective two ends of the upper and lower capacitors are directly connected in parallel with resistors having the same resistance. According to the voltage divider theorem, the respective voltages of the resistors connected in parallel are the same, such that the capacitor voltage will be the same as the voltage of the resistor to ensure the balance of the respective voltages of the upper and lower capacitors. However, the resistors connected in parallel will produce power consumption and reduce the efficiency. If the resistance of the parallel resistors is too large, the improvement will not be significant. If the resistance of the parallel resistors is small, the power consumption will be highly increased.

In addition, U.S. Pat. No. 6,314,007 disclosed a compensating technique which starts with setting voltage level, switching an auxiliary switch while the capacitor voltage is higher or lower than the voltage level, and then the current flows through the auxiliary inductor to charge the upper and lower capacitors to ensure the capacitor voltage balance between the upper and lower capacitors. It can prevent the influence of the capacitor voltage to the output voltage waveform.

As disclosed in the aforementioned prior art, it was necessary to set the voltage level to balance the capacitor voltage to prevent the waveform of the output voltage from distortion. However, while the load or the output frequency is different, it is necessary to set different voltage level. If the range of the voltage level is too small, the auxiliary switch will begin switching before the waveform of the output voltage becomes distorted. It will cause unnecessary switching losses to reduce the overall efficiency of the inverter. On the contrary, if the range of the voltage level is too large, the auxiliary switch may be too slowly activated to still cause distorted waveform of the output voltage due to the capacitor voltage unbalance.

Therefore, when the output terminal of the half-bridge inverter is connected to variable load, e.g. the amplitude or the frequency is variable, the aforementioned prior art fails to take care of the quality of the waveform of the output voltage and the efficiency of the inverter at the same time.

SUMMARY OF THE INVENTION

The primary objective of the present invention is to provide a method of compensating output voltage distortion of a half-bridge inverter and a device based on the method, which can not only definitely detect the voltage distortion and then do the compensation to further improve the drawback that the waveform of the output voltage is distorted, but also be of simple circuit and easy for control.

The secondary objective of the present invention is to provide a method of compensating capacitor voltage unbalance of a half-bridge inverter and a device based on the method, which can reduce the capacitance of the upper and lower capacitors and be applicable to every output frequency.

The foregoing objectives of the present invention are attained by the method and the device. The method includes the steps of measuring the voltage of at least one capacitor of the half-bridge inverter and then detecting the output voltage of the half-bridge inverter; comparing the capacitor voltage and the output voltage to identify how much degree the distortion is resulted from the capacitor voltage unbalance, wherein if the degree of the distortion matches a predetermined condition, indicating the electric energy of the capacitor is too insufficient to provide a load, i.e. the capacitor voltage unbalance, proceed to the next step, and if the degree of the distortion does not match the predetermined condition, indicating the capacitor voltage balance, do not proceed to the next step; and charging the capacitor through a compensating circuit to compensate the capacitor for the insufficient electric energy to enable the capacitor to provide the load with the sufficient electric energy.

The device is composed of a half-bridge inverter and a compensating circuit. The half-bridge inverter includes an upper capacitor and a lower capacitor, both of which are connected in series, a first switch and a second switch, both of which are connected in series, and an inductor having an end connected with a node located between the first and second switches and the other end thereof defined as a first output end. A node located between the upper and lower capacitors is defined as a second output end. The voltage difference between the two output ends is the output voltage. The compensating circuit includes an upper compensating switch, a lower compensating switch, and a compensating inductor. The upper and lower compensating switches are serially interconnected. The compensating inductor has an end connected with a node located between the upper and lower compensating switches and the other end thereof connected a node located between the upper and lower capacitors.

BRIEF DESCRIPTION OF THE DRAWINGS

FIGS. 7(a) and 7(b) are oscillograms of the preferred embodiment of the present invention, wherein FIG. 7(a) illustrates the waveform of the output voltage while the compensating circuit is not included, and FIG. 7(b) illustrates the waveform of the output voltage while the compensating circuit is included.

DETAILED DESCRIPTION OF PREFERRED EMBODIMENTS

Figure 1:
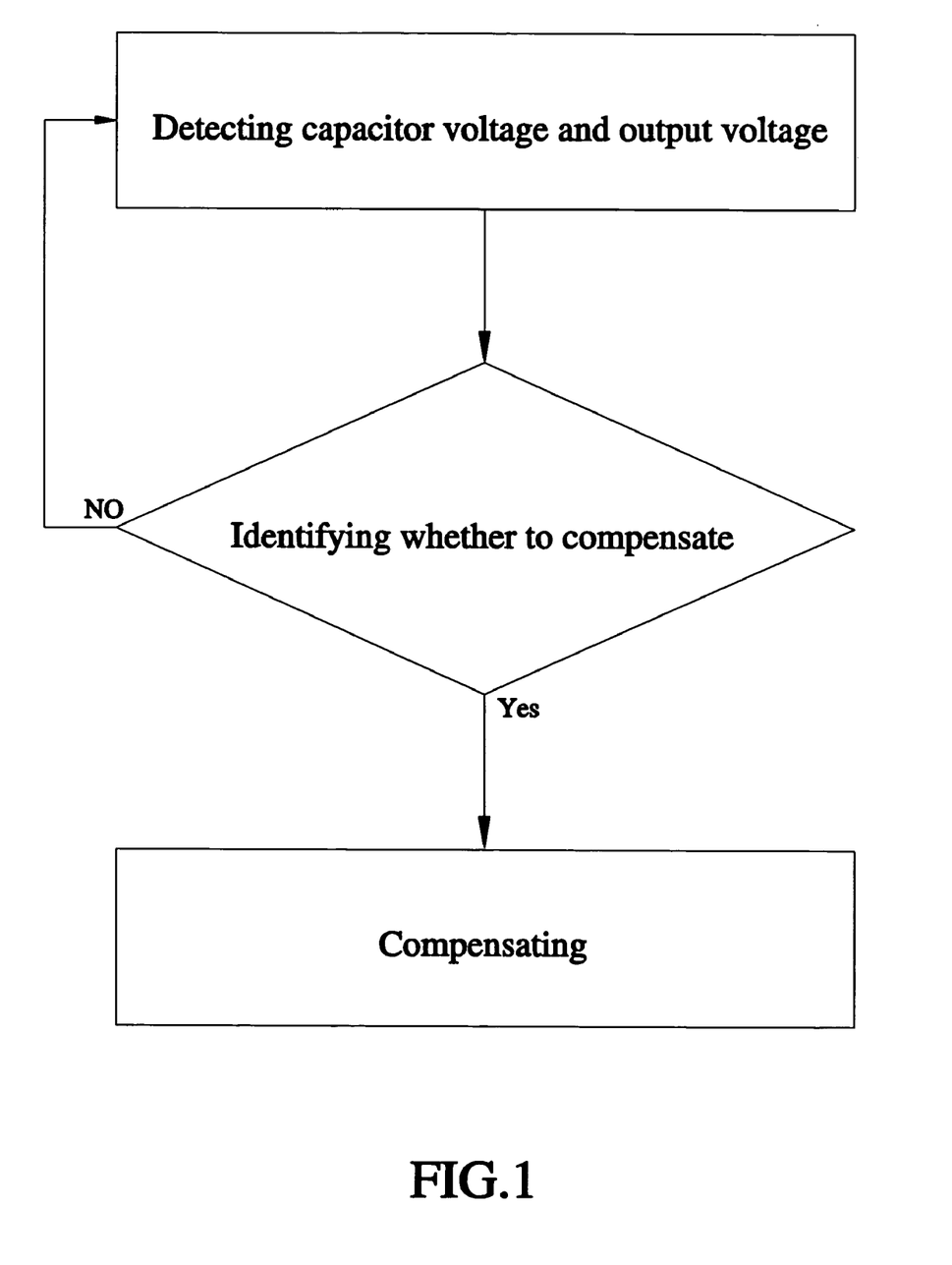
FIG. 1 is a decision flowchart of a preferred embodiment of the method of the present invention.
Figure 2:
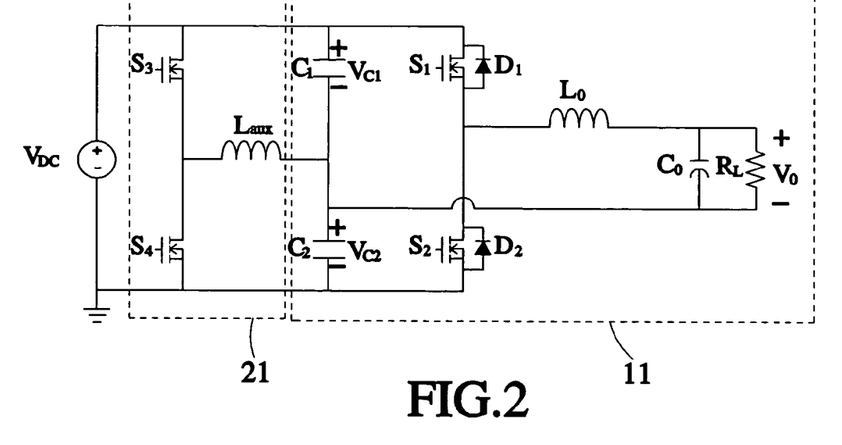
FIG. 2 is a schematic view of a circuitry based on the method of the preferred embodiment of the present invention.

Referring to FIGS. 1-2, a method of compensating capacitor voltage unbalance of a half-bridge inverter, according to a preferred embodiment of the present invention, includes the following steps.

A. Detecting Capacitor Voltage and Output Voltage

Measure a voltage of at least one capacitor of a half-bridge inverter 11 and detect an output voltage $V_O$ of the half-bridge inverter 11. In this embodiment, the half-bridge inverter 11 includes two capacitors, i.e. an upper capacitor $C_1$ and a lower capacitor $C_2$, one or two of which are for measurement and detection.

B. Identifying Whether to Compensate

Compare the output voltage with the measured voltages $V_{C1}$ and $V_{C2}$ of the two capacitors $C_1$ and $C_2$ in the step A and identify the degree of distortion of the output voltage $V_O$ while the voltages $V_{C1}$ and $V_{C2}$ are unbalanced. If the degree of distortion matches a predetermined condition, the electric energy of the capacitors $C_1$ and $C_2$ will be too sufficient to provide a load $R_L$, i.e. the voltages $V_{C1}$ and $V_{C2}$ are unbalanced, proceed to the next step. If the degree of distortion does not match the predetermined condition, i.e. the voltages $V_{C1}$ and $V_{C2}$ are balanced, do not proceed to the next step. When the comparison indicated in the step B proceeds, there are two different circumstances recited below during the positive and negative half cycles of the output voltage $V_O$.

a. During the positive half cycle of the output voltage $V_O$, if one of the predetermined conditions are matched, i.e. the degree of distortion matches one of the predetermined conditions, the upper capacitor $C_1$ will fail to provide sufficient electric energy for the load $R_L$. The predetermined conditions include:
1. After compared with the positive voltage of the output voltage $V_O$, the positive voltage of the upper capacitor $C_1$ is lower than that of the output voltage $V_O$.
2. After compared with the negative voltage of the output voltage $V_O$, the negative voltage of the upper capacitor $C_1$ is higher than that of the output voltage $V_O$.
3. After compared with the positive voltage of the output voltage $V_O$, the sum of the positive voltage of the input voltage $V_{DC}$ of the half-bridge inverter 11 plus the negative voltage of the lower capacitor $C_2$ is lower than the positive voltage of the output voltage $V_O$.
4. After compared with the negative voltage of the output voltage $V_O$, the sum of the negative voltage of the input voltage $V_{DC}$ plus the positive voltage of the lower capacitor $C_2$ is higher than the negative voltage of the output voltage $V_O$.

b. During the negative half cycle of the output voltage $V_O$, if the predetermined conditions are matched, i.e. the distortion matches the predetermined conditions, the upper capacitor $C_2$ will fail to provide sufficient electric energy for the load $R_L$. The predetermined conditions include:
1. After compared with the positive voltage of the output voltage $V_O$, the negative voltage of the lower capacitor $C_2$ is higher than the positive voltage of the output voltage $V_O$.
2. After compared with the negative voltage of the output voltage $V_O$, the positive voltage of the lower capacitor $C_2$ is lower than the negative voltage of the output voltage $V_O$.
3. After compared with the positive voltage of the output voltage $V_O$, the sum of the negative voltage of the input voltage $V_{DC}$ of the half-bridge inverter 11 plus the positive voltage of the upper capacitor $C_1$ is higher than the positive voltage of the output voltage $V_O$.
4. After compared with the negative voltage of the output voltage $V_O$, the sum of the positive voltage of the input voltage $V_{DC}$ plus the negative voltage of the upper capacitor $C_1$ is lower than the negative voltage of the output voltage $V_O$.

C. Compensating

Figure 3:
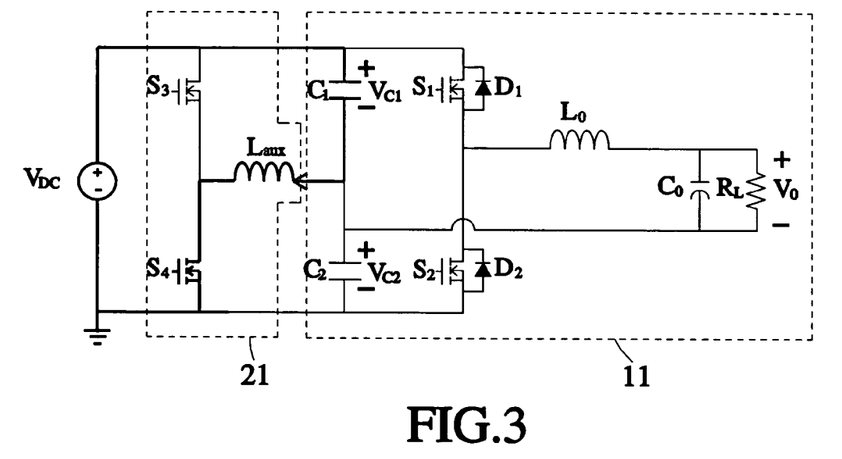
FIG. 3 is another schematic view of the circuitry based on the method of the preferred embodiment of the present invention, showing a current path.
Figure 4:
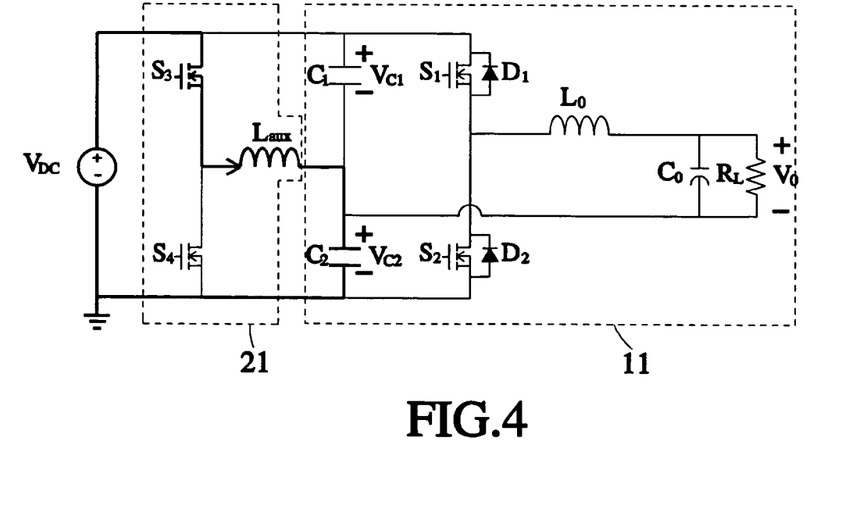
FIG. 4 is another schematic view of the circuitry based on the method of the preferred embodiment of the present invention, showing another current path.
Figure 5:
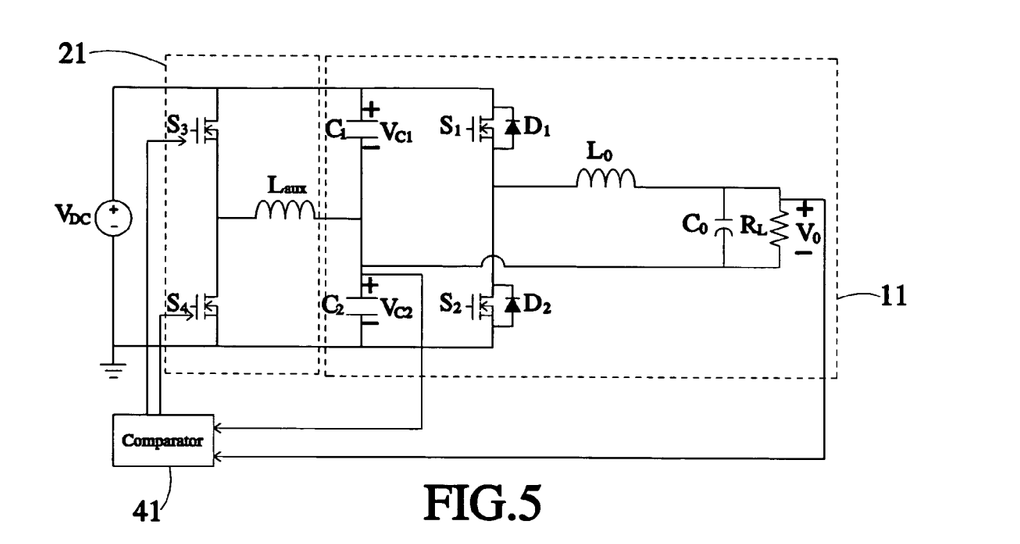
FIG. 5 is another schematic view of the circuitry based on the method of the preferred embodiment of the present invention at work.
Figure 6:
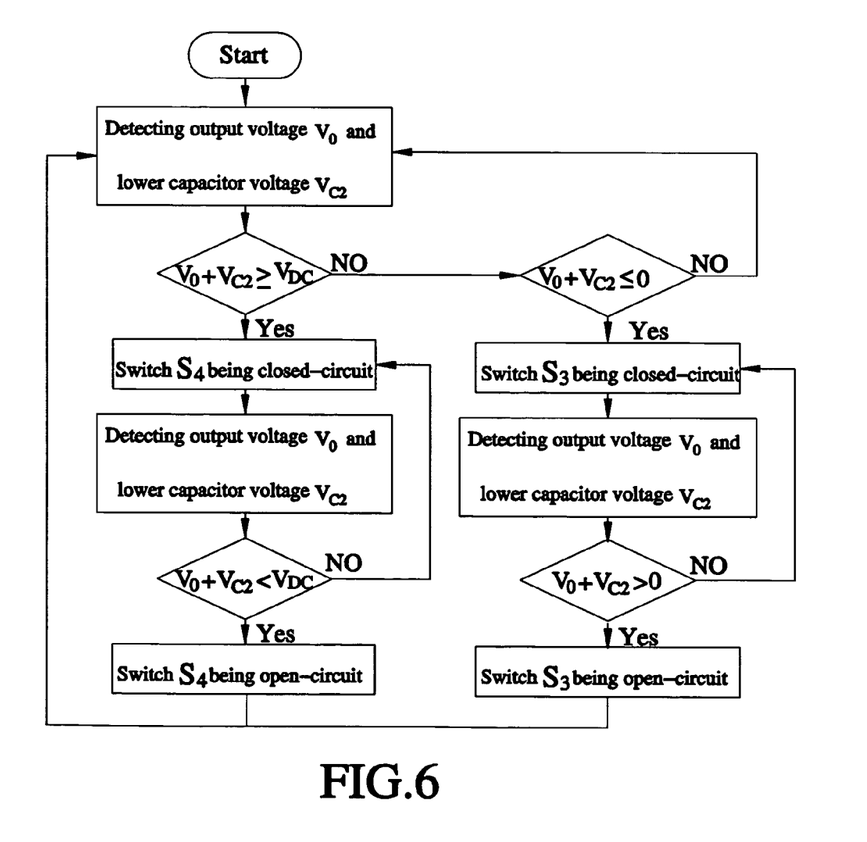
FIG. 6 is a decision flowchart of the method of the preferred embodiment of the present invention.

Charge the capacitors with a compensating circuit 21 to provide the upper and lower capacitors $C_1$ and $C_2$ with sufficient electric energy for compensation to further provide the sufficient electric energy for the load $R_L$. The compensating circuit 21 includes an upper compensating switch $S_3$, a lower compensating switch $S_4$, and a compensating inductor $L_{aux}$. As shown in FIG. 3, during the positive half cycle of the output voltage $V_O$, the upper capacitor $C_1$ fails to provide sufficient electric energy for the load $R_L$ and then the lower compensating switch $S_4$ is turned on to work together with the compensating inductor $L_{aux}$ to become a charging path for charging the upper capacitor $C_1$ until the voltage of the upper capacitor $C_1$ is higher than that of the output voltage $V_O$, after which, the lower compensating circuit $S_4$ is open-circuit. As shown in FIG. 4, during the negative half cycle of the output voltage $V_O$, the lower capacitor $C_2$ fails to provide sufficient electric energy for the load $R_L$ and the upper compensating switch $S_3$ is turned on to work together with compensating inductor $L_{aux}$ to become a charging path for charging the lower capacitor $C_2$ until the voltage of the lower capacitor $C_2$ is higher than the negative voltage of the output voltage $V_O$, after which, the upper compensating circuit $S_3$ is open-circuit. As shown in FIG. 5, taking the detection of voltage of the lower capacitor $C_2$ for an example, compare it with the output voltage $V_O$, and then control ON/OFF of the upper and lower compensating switches $S_3$ and $S_4$ according to the result of the comparison to further achieve the output voltage compensation. The whole control and decision-making processes of the compensating circuit 21 are shown in FIG. 6, wherein $V_{C2}$ indicates the voltage of the lower capacitor $C_2$, $V_O$ indicates the output voltage, and $V_{DC}$ indicates the input voltage.

Figure 7A:
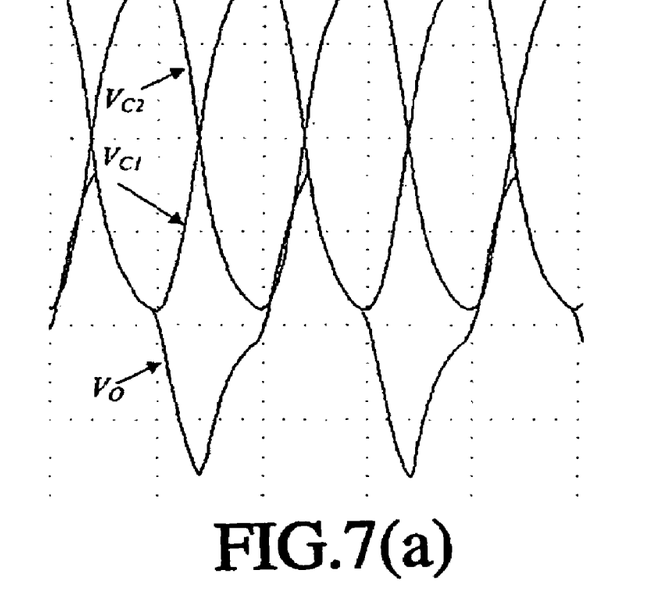
Figure 7B:
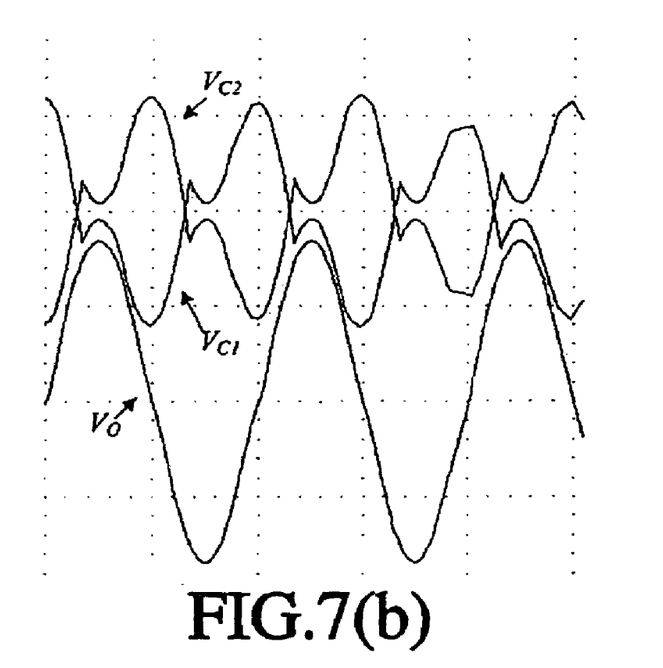

FIGS. 7(a) and 7(b) each illustrate the waveforms of the output voltage $V_O$ and those of the capacitor voltages $V_{C1}$ and $V_{C2}$. FIG. 7(a) shows the waveforms before the compensating circuit 21 is included, illustrating that the waveform of the output voltage $V_O$ distorts to cause distortion. FIG. 7(b) shows the waveforms after the compensating circuit 21 is included, illustrating that the serially connected capacitor voltages $V_{C1}$ and $V_{C2}$ are though still unbalanced but the waveform of the output voltage $V_O$ has no longer caused distortion resulted from the distortion of the capacitor voltages $V_{C1}$ and $V_{C2}$.

In light of the above, a compensative electric energy can be actively provided to the upper or lower capacitor $C_1$ or $C_2$ for its insufficient electric energy to enable the capacitor to provide the load $R_L$ with sufficient electric energy. The output voltage $V_O$ does not cause any waveform distortion resulted from the distortion of the capacitor voltages $V_{C1}$ and $V_{C2}$.

Figure 8:
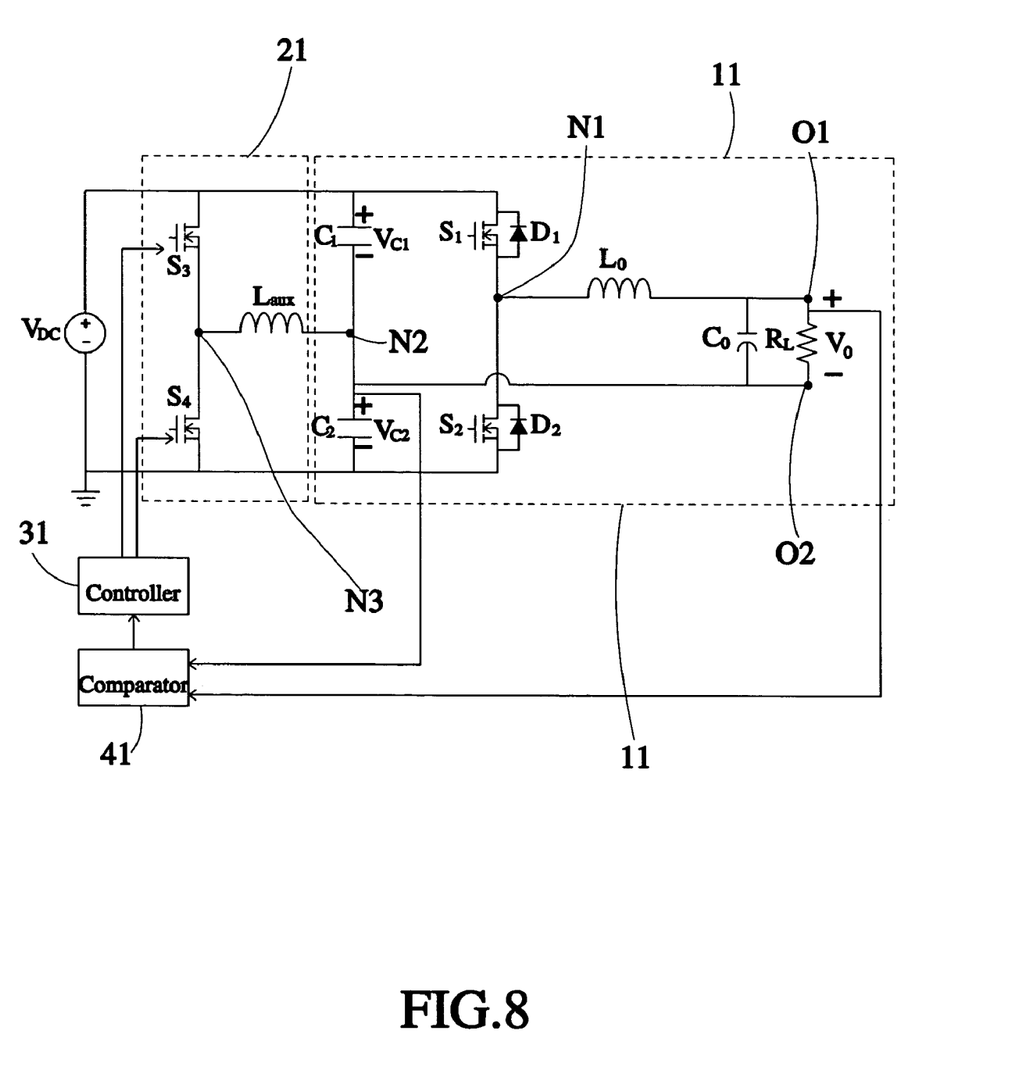
FIG. 8 is a schematic view of a circuitry of the device based on the method of the preferred embodiment of the present invention, showing the structure of the device.

Further referring to FIG. 8, a device based on the aforementioned method of the present invention is composed of a half-bridge inverter 11 and a compensating circuit 21.

The half-bridge inverter 11 includes an upper capacitor $C_1$ and a lower capacitor $C_2$, which are serially interconnected, a first switch $S_1$ and a second switch $S_2$, which are serially interconnected, and an inductor $L_O$ having two ends, one of which is connected to a node N1 located between the first and second switches $S_1$ and $S_2$ and the other of which is defined as a first output end O1. A node N2 located between the upper and lower capacitors $C_1$ and $C_2$ is defined as a second output end O2. The voltage difference between the first and second output ends O1 and O2 is the output voltage $V_O$.

The present invention is characterized as recited below.

The compensating circuit 21 includes an upper compensating switch $S_3$, a lower compensating switch $S_4$, and a compensating inductor $L_{aux}$. The upper compensating switch $S_3$ is serially connected with the lower compensating switch $S_4$. The compensating inductor $L_{aux}$ has two ends, one of which is connected to a node N3 located between the upper and lower compensating switches $S_3$ and $S_4$ and the other end of which is connected to the node N2. The device further includes a controller 31 and a comparator 41. The controller 31 is connected to upper compensating switch $S_3$ and the lower compensating switch $S_4$ for controlling ON/OFF of the upper compensating switches $S_3$ and $S_4$. The comparator 41 is connected to the upper and lower capacitors $C_1$ and $C_2$ and to the first output end O1 for comparison between the capacitor voltages $V_{C1}$ and $V_{C2}$ and the output voltage $V_O$. The comparator 41 can be employed for the comparison of voltage. The controller 31 can be employed for controlling ON/OFF of the two compensating switches $S_3$ and $S_4$.

The method of the present invention can be based on the circuitry structure of the device for enabling.

In conclusion, the present invention includes the following advantages.

1. Improving the Waveform Distortion of the Output Voltage

The present invention definitely detects the voltage distortion to enable the capacitor voltage compensation through active components to provide sufficient electric energy for the load $R_L$, i.e. improving the waveform distortion of the output voltage $V_O$, such that the load $R_L$ can work normally. In addition, the present invention is substantially of simple circuit and easy control.

2. Decreasing Capacitance

The present invention enables less high requirement for the capacitance.

Specifically, the capacitance of the capacitor used in the present invention is smaller than that of the half-bridge inverter and can still enable the capacitor to have sufficient electric energy through active compensation. In other words, both of the size and cost of the capacitor can be greatly reduced. Further, the active compensation of the present invention is applicable to the working environment of any output frequency without limitation.

Although the present invention has been described with respect to a specific preferred embodiment thereof, it is no way limited to the details of the illustrated structures but changes and modifications may be made within the scope of the appended claims.

What is claimed is:

1. A method of compensating capacitor voltage distortion of a half-bridge inverter, comprising steps of:
   (a) measuring a voltage of at least one capacitor of said half-bridge inverter and detecting an output voltage of said half-bridge inverter;
   (b) comparing said voltage of said at least one capacitor with said output voltage and then identifying a degree of distortion of said output voltage that results from capacitor voltage unbalance,
      if the degree of distortion matches a predetermined condition, indicating that said capacitor has insufficient electric energy to supply electric energy to a load without generating said degree of distortion, identifying said capacitor as a voltage-unbalanced capacitor, and then proceeding to the next step;
      if the degree of distortion does not match the predetermined condition, indicating that said capacitor has sufficient electric energy to provide electric energy to the load without generating said degree of distortion, and not proceeding to the next step; and
   (c) charging said capacitor with a compensating circuit to enable said capacitor to provide sufficient electric energy for the load without said degree of distortion.

2. The method as defined in claim 1, wherein said half-bridge inverter comprises an upper capacitor and a lower capacitor.

3. The method as defined in claim 2, wherein in step (b), during a positive half cycle of said output voltage, said upper capacitor has insufficient electric energy for the load if the degree of distortion matches one of the following conditions:
   after comparison with the positive voltage of the output voltage $V_O$, the positive voltage of the upper capacitor $C_1$ is lower than that of the output voltage $V_O$;
   after comparison with the negative voltage of the output voltage $V_O$, the negative voltage of the upper capacitor $C_1$ is higher than that of the output voltage $V_O$;
   after comparison with the positive voltage of the output voltage $V_O$, the sum of the positive voltage of the input voltage $V_{DC}$ of the half-bridge inverter 11 plus the negative voltage of the lower capacitor $C_2$ is lower than the positive voltage of the output voltage $V_O$; and
   after comparison with the negative voltage of the output voltage $V_O$, the sum of the negative voltage of the input voltage $V_{DC}$ plus the positive voltage of the lower capacitor $C_2$ is higher than the negative voltage of the output voltage $V_O$.

4. The method as defined in claim 2, wherein during a negative half cycle of said output voltage, said lower capacitor has insufficient electric energy for the load if the degree of distortion matches one of the following conditions:
   after comparison with the positive voltage of the output voltage $V_O$, the negative voltage of the lower capacitor $C_2$ is higher than the positive voltage of the output voltage $V_O$;
   after comparison with the negative voltage of the output voltage $V_O$, the positive voltage of the lower capacitor $C_2$ is lower than the negative voltage of the output voltage $V_O$;
   after comparison with the positive voltage of the output voltage $V_O$, the sum of the negative voltage of the input voltage $V_{DC}$ of the half-bridge inverter 11 plus the positive voltage of the upper capacitor $C_1$ is higher than the positive voltage of the output voltage $V_O$; and
   after comparison with the negative voltage of the output voltage $V_O$, the sum of the positive voltage of the input voltage $V_{DC}$ plus the negative voltage of the upper capacitor $C_1$ is lower than the negative voltage of the output voltage $V_O$.

5. The method as defined in claim 3 or 4, wherein said compensating circuit comprises an upper compensating switch, a lower compensating switch, and a compensating inductor; wherein when said upper capacitor fails to provide sufficient electric energy for the load, said lower compensating switch is turned on to work together with said compensating inductor to become a charging path for charging said upper capacitor; and wherein when said lower capacitor fails to provide sufficient electric energy for the load, said upper compensating switch is turned on to work together with said compensating inductor to become a charging path for charging said lower capacitor.

6. A device based on the method defined in claim 1, comprising:
   a half-bridge inverter having an upper capacitor and a lower capacitor, which are serially interconnected, a first switch and a second switch, which are serially interconnected, and an inductor having two ends, one of which is connected to a node located between said first and second switches and the other of which is defined as a first output end, a node located between said upper and lower capacitors being defined as a second output end, a voltage difference between said first and second output ends being said output voltage; and
   a compensating circuit having an upper compensating switch, a lower compensating switch, and a compensating inductor, said upper and lower compensating switches being serially interconnected, said compensating inductor having two ends, one of which is connected to a node located between said upper and lower compensating switches and the other of which is connected to a node located between said upper and lower capacitors.

7. The device as defined in claim 6, further comprising a controller and a comparator, wherein said controller is connected to said upper and lower compensating switches, and said comparator is connected to said output voltage and said lower capacitor.

* * * * *